United States Patent [19]
Riller et al.

[11] 3,876,038
[45] Apr. 8, 1975

[54] FOOD SERVING EQUIPMENT

[75] Inventors: Peter Riller, Neu-Isenburg; Manfred Wolff, Eltville; Bernhard Klauk; Gunter Sieke, Gelsenkirchen, all of Germany

[73] Assignee: F. Kuppersbusch & Sohne, Aktiengesellschaft, Gelsenkirchen, Germany

[22] Filed: Mar. 28, 1973

[21] Appl. No.: 345,769

[30] Foreign Application Priority Data
Mar. 28, 1972 Germany............................ 2215069

[52] U.S. Cl................. 186/1 B; 198/40; 340/286 R
[51] Int. Cl............................................. E04h 3/04
[58] Field of Search........ 198/38, 40; 186/1 R, 1 B, 186/1 C, 1 D; 340/147 A, 286 R

[56] References Cited
UNITED STATES PATENTS

| | | | |
|---|---|---|---|
| 1,574,914 | 3/1926 | McNamara | 198/40 |
| 1,988,936 | 12/1930 | Brand | 186/1 B |
| 1,993,406 | 3/1935 | Herold et al. | 198/40 |
| 2,315,659 | 4/1943 | Russel | 198/38 |
| 3,251,452 | 5/1966 | Conway et al. | 198/34 |
| 3,304,416 | 2/1967 | Wolf | 340/286 X |
| 3,310,797 | 3/1967 | Auger | 340/286 |
| 3,618,742 | 5/1970 | Blanchard et al. | 198/40 |
| 3,667,588 | 6/1972 | Traube | 198/38 |
| 3,746,130 | 7/1973 | Bullas | 186/1 B |

Primary Examiner—Evon C. Blunk
Assistant Examiner—Richard K. Thomson
Attorney, Agent, or Firm—Stevens, Davis, Miller & Mosher

[57] ABSTRACT

Food storing equipment comprises a conveyor belt for trays equipped with food receptacles which passes a plurality of trolleys each having a plurality of food containers containing menu components and from which menu components are to be served to the trays, first indicating means being provided for each trolley for indicating the menu components to be served to a particular tray and second indicating means being provided for indicating the menu components to be served to a subsequent tray.

6 Claims, 1 Drawing Figure

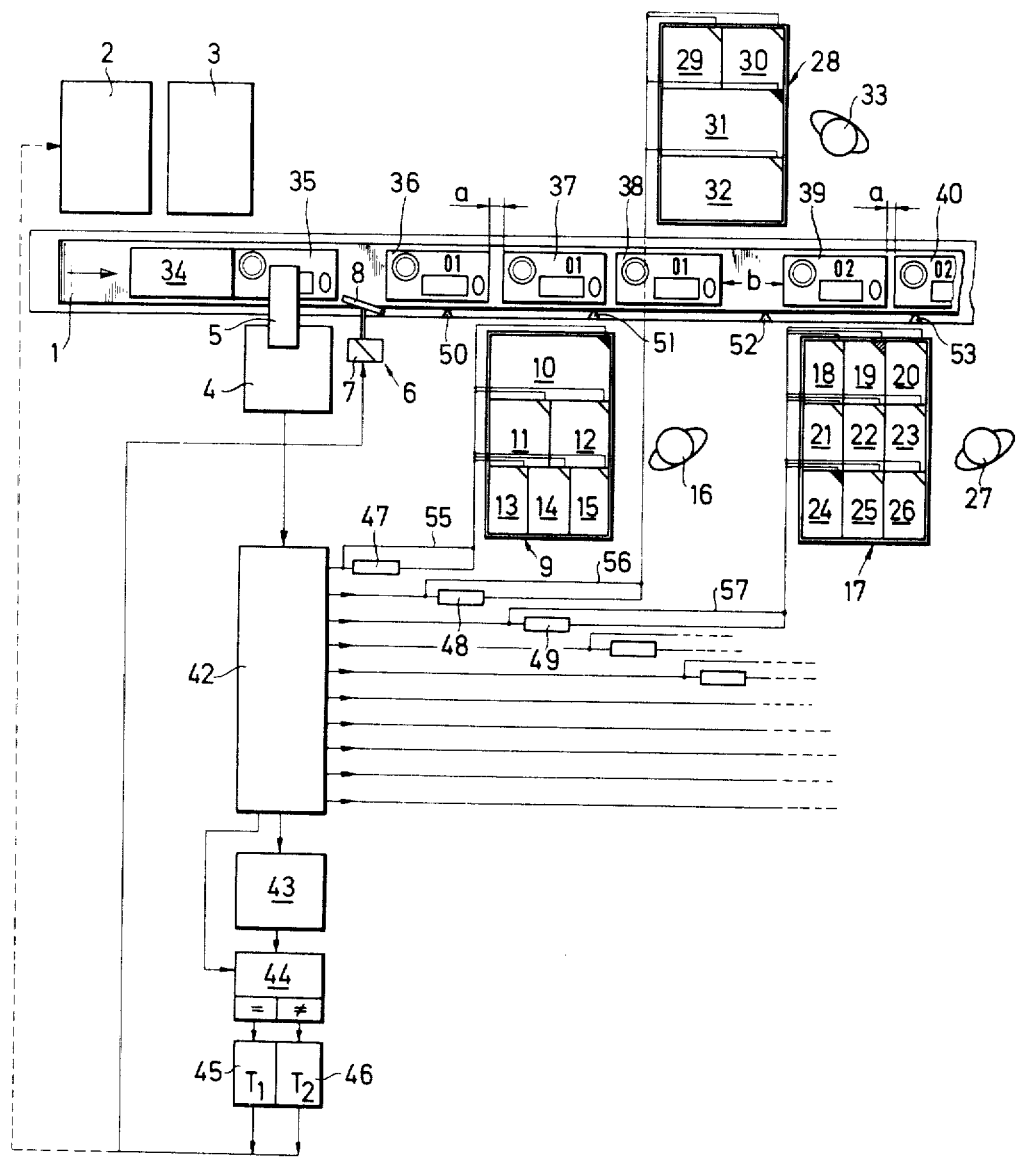

FOOD SERVING EQUIPMENT

BACKGROUND OF THE INVENTION

The invention relates to food serving equipment. Such equipment may comprise a conveyor belt, which moves past food serving trolleys set up near the conveyor belt having parts equipped with food receptacles (plates, cups or the like), for the purpose of putting together menus, characterized by different menu numbers. The food serving trolleys have containers filled with menu components, with which are associated indicating means, which indicate to the server standing near the trolley the menu components to be served on to the tray just passing. Such food serving equipment is particularly suitable for hospitals and like establishments.

Food serving equipment with a conveyor belt is already known, in which serving devices are arranged on one or both sides of the conveyor belt. At the start of the belt there is a tray dispenser, followed by a dispenser for dishes and a dispenser for the set of knife, fork and spoon. Then serving trolleys with the most varied of menu components follow in the direction of movement of the belt. A server is assigned to each serving trolley (the Kuppersbusch Company's brochure "Food Serving Equipment"). Each tray placed on the conveyor belt is equipped with a patient's card from which the patient's diet details can be seen (colour or symbol marking). The servers standing at the food serving trolleys must scrutinize the patients' cards passing just in front of them in order to take the menu components to be served on to the tray from his serving trolley, as a result of the mark. Reading patients' cards by the servers necessitates a certain concentration, memory and gift of combination, as a result of which errors in the serving of the menu components cannot be excluded.

Food serving equipment is also known in which the reading of the patient's card by the food server is dispensed with. The different diet forms are here specified in coded form by so-called menu numbers. The patients' cards are made up as punched cards, which are fed into a reading device which reads the coded recording of the cards. After the reading process, the coded patient's card is discarded on to the tray standing just in front of the reading device. The food server is, in the case of this equipment, informed by light signals which menu components have to be served on to the tray just passing. The serving trolleys are equipped on their broad sides with lamps for this purpose, which lamps are associated with the containers of the food serving trolley (brochure of the Voss Company's brochure "Modules of the Programme-Controlled Feeding Centre"). The food serving trolleys can have up to nine containers for the most varied of menu components. Furthermore, in the equipment, the trays are close together on the conveyor belt and with a relatively fast throughput of trays the lamp lights up for the menu components to be immediately served only for relatively short periods. The food server will remove the menu components from the associated containers when a lamp lights up and put these components on the tray just passing. If too much time is required by the food server for this, the food server can become delayed with the serving in the case of the relatively rapid sequences of the illumination of the different lamps on the food serving trolley, so that errors in serving again cannot be excluded.

SUMMARY OF THE INVENTION

It is an object of the invention to provide the food server with such information aids that he always retains the overall view of the menu components to be served one after the other even in the case of a relatively high tray throughput and corresponding signal sequence.

According to the invention, there is provided food serving equipment comprising a conveyor belt for trays equipped with food receptacles, a plurality of food serving trolleys past which said conveyor belt runs and from which food can be served into said food receptacles of said trays, a plurality of containers for menu components to be served and positioned in each said food serving trolleys, first means for indicating at each said food serving trolleys the menu component to be supplied from said food serving trolleys to a passing tray and second means for indicating at each said food serving trolley a menu component to be supplied from said food serving trolley to a subsequent tray.

BRIEF DESCRIPTION OF THE DRAWINGS

The invention will now be described in greater detail, by way of example, with reference to the drawing, the single FIGURE of which shows only the elements of food-serving equipment necessary for understanding the present invention.

DESCRIPTION OF THE PREFERRED EMBODIMENT

The equipment comprises a conveyor belt 1, which runs in the direction of the arrow. Only a section of this conveyor belt is shown. A tray dispenser 2 and a dispenser 3 for dishes and sets of knife, fork and spoon are positioned at the start of the conveyor belt. A punched card reader 4 with a card discharge device 5 follows on the other side of the conveyor belt 1. A tray release device 6 is provided next to the punched card reader, which device coprises a release magnet 7 with a lever 8 actuated by the magnet and supported on one side. The starting position of the lever 8 is shown. The lever, according to its position, prevents or releases a further movement of the trays issued by the tray dispenser 2 and equipped by the dispenser 3 with the dishes and sets of knife, fork and spoon. A food serving trolley 9 with six containers 10 to 15 is arranged on the same side of the conveyor belt 1 as the punched card reader 5. The trolley is used by a food server 16. A further trolley 17 with nine containers 18 to 26 follows trolley 9 and is spaced therefrom. This trolley 17 is used by a further food server 27. A food serving trolley 28 with four containers 29 to 32 which is used by a food server 33 is located on the other side of the conveyor belt 1.

Still further food serving trolleys (not shown) with associated food servers follow the trolleys 17 and 28. For example, ten food serving trolleys in all can be provided.

As indicated, the trays 34 to 40 are issued by the tray dispenser.

The hitherto described construction of the actual food serving equipment is basically known.

The containers of the food serving trolleys 9, 17 and 28 are equipped with indicators (lamps) which are represented by triangles in the FIGURE. In this case a black triangle is used to indicate an intensive illumination of the lamp and a hatched triangle a matt or intermittent illumination of a lamp.

Now the invention starts from the recognition that the most varied diet types which are characterized by the most varied menu numbers are frequently served in groups, i.e., that one and the same diet type is served on a certain number of trays following one after the other and in that thereafter a change in the diet type takes place, which like-wise again involves a certain number of trays. The food server thus receives light commands for one diet type. The light commands for this diet type are always the same. If the diet type changes, this must be noted by the food server, since other menu components have to be provided on a number of trays.

In accordance with the invention, a change in the diet type is indicated to the food server by a change in the spacing between the two adjacent trays on the conveyor belt 1 with different menu numbers, as soon as a change in the menu number with respect to the menu numbers passing the card reader has occurred. All of the food servers can recognize a larger spacing between the groups of trays collected together, which are coming towards them and thus know in advance from which tray the menu components must change per se.

In the drawing the trays 36 to 38 are assigned the menu number 01 and the trays 39, 40 the menu number 02. As is obvious, there is a spacing $a$ within each group of trays whereas an increased spacing $b$ is provided between the neighbouring trays 38, 39 resulting from a change in menu numbers.

By the variation of the tray spacing the food servers already see from a distance that a change in the serving of the menu components is coming towards them.

The variation of the tray spacing by changing a menu number is achieved in the following manner.

The punched card reader 4 feeds its information to a control device 42. A store 43 is connected after this control device. The control device 42 feeds the information just read by the punched card reader 4 to a comparator 44 which compares this information with the information already in the store 43, of the preceding reading operation. If there is agreement between these two pieces of information, a timer 45 is triggered by the comparator 44. The timer triggers the release magnet 7 at a time $T_1$ after the last tray release 6 in such a manner that a tray spacing $a$ results. If the pieces of information in the store device 42 and in the store 43 are not the same, the comparator 44 trigger another timer 46 which undertakes the release of the next tray only after a time $T_2$, whereby a tray spacing $b$ results.

As shown by the broken lines, the timers 45, 46 can also trigger the tray dispenser 2. This is done particularly if no particular tray release device 6 is provided on the belt 1.

Furthermore, the food server is warned not only as hitherto by a light command at the food serving trolley, which menu component is to be served on the tray just passing, but in addition, also the menu components for the subsequent tray.

As is obvious from the FIGURE, the server 16 standing at the food serving trolley 9 is signalled that the menu component 10 is to be put on to the tray 37 whereas the server 33 standing at the food serving trolley 28 is signalled that the menu component 31 is to be put on to the tray 38. The server 27 standing at the food serving trolley 17 is signalled that the menu component 24 is to be put on to the tray 39. At the food serving trolley 17, in addition to the menu component 24, which must be just served, also further the menu component 19 is indicated, which is to be put on to the tray 38 following the tray 39. As stated above, the broken triangle represents a lamp which lights up intermittently or weakly and thus indicates to the server 27 the next menu component to be served.

As shown schematically, a store 47 is associated with the indicators of the food serving trolley 9, a store 48 with the indicators of the food serving trolley 28 and a store 49 with the indicators of the food serving trolley 17. Corresponding stores are associated with the seven other food serving trolleys (not shown) with their indicators.

The preliminary signal and the main signal of the indicators follow in the following manner.

For example, stationary interrogator elements (make contacts) 50 to 53 can be arranged on the conveyor belt 1. With ten food serving trolleys the control device 42 has ten serving stores, as indicated by the ten outputs of the control device 42. The information read by the punched card reader 4, from the patients' cards, is read in, in lines, into this initial store.

It is assumed that the information of the patient's card associated with the tray 36 is read by the card reader 4 and has filled each line of the ten serving stores of the control device 42. The tray 36 is then released by the tray release 6 and moved in the direction of the arrow. If this tray 36 arrives at the interrogator element 50, the latter emits such a signal to the control device 42 that the corresponding line is read out of the serving stores of the same for the serving point 9. The information, which is preliminary information, passes directly through the line 55 to one of the indicators 10 to 15 and triggers it so that the latter lights up in a dim or intermittent fashion. Simultaneously, this pre-information arrives in the store 47 in which it remains stored until the entry of the next tray and shifts the preliminary information of the last tray as main information to the indicators. This information shifted out of the store now leads to the bright illumination of the corresponding indicator and thus characterizes the components to be served now at the trolley 9. Since in the case of the example chosen, the menu number has not been changed, the indicator of the container 10 receives at the point 9 both the preliminary and the main information and lights up brightly.

The same procedure is repeated at the other serving points 28, 17 and so on. For the serving point 28, the interrogator element 51 causes a preliminary indication of one of the indicators 29 to 32. With the arrival of the tray 38 at the interrogator element 51, a line associated with the serving point 28 is read out of the serving stores of the control device 42 and the information goes at once directly via the line 56 to one of the indicators 29 to 32 as preliminary indication. This preliminary information also arrives in the store 48 associated with this serving point 28. If the tray 37 then arrives — as shown in the example — at the interrogator element 51, a next line for the serving point 28 is thus read out of the serving stores of the control device 42, whereby the previous preliminary information for the indicator 31 is shifted out of the store 48 and thus an intensive illumination of the indicator 31 results. A new piece of preliminary information for one of the indicators 29, 30, 32 has arrived in the store 48 and this information has also arrived directly through the line 56 at one of the indicators of the serving point 28 which thus again lights up in a dim or intermittent fashion. In the example, even here the preliminary and main information also agree, because the menu numbers have not been changed so that only indicator 31 lights up brightly.

The interrogator element 52 also causes the preliminary indication of one of the indicators 18 to 26 of the food serving trolley 17. In the example shown it is assumed that the menu component 19 is to be served for the tray 38 arriving, whereas the menu component 24 is to be served to the tray 39 already present. The preliminary information 19 is applied through the line 57 to the corresponding indicator and is also found in the store 49, from which the previously present information for the indicator 24 has been shifted out, so that the latter now lights up intensively.

The drive rollers for the conveyor belt 1 can also be provided with cams instead of the interrogator elements 50 to 53 which cams can have a corresponding spacing from each other and actuated by a switch.

It will be understood that the above description of the present invention is susceptible to various modification changes and adaptations.

What is claimed is:

1. Food serving equipment comprising a conveyor belt, a plurality of trays equipped with food receptacles associated with said conveyor belt, a plurality of food serving trolleys past which said conveyor belt runs and from which food can be served into said food receptacles of said trays, a plurality of containers for menu components to be served and positioned in each said food serving trolleys, storage means for storing information regarding menu components to be served to associated ones of said trays, reading means for reading said information stored in said storage means, signal producing means responsive to said reading means for providing first signals at said food serving trolleys relating to the menu component to be supplied from said food serving trolley to a passing tray and second signals at said food serving trolleys relating to the menu component to be supplied from said food serving trolley to a subsequent tray, and visual indication means on said food serving trolleys responsive to said first and second signals of said signal producing means for providing visual indication to operators of said food serving trolleys of the menu components to be supplied.

2. Food serving equipment as defined in claim 1, and comprising means responsive to said reading means for varying the spacing between adjacent trays where different menu components are to be served for providing a visual warning of a change of menu components.

3. Food serving equipment as defined in claim 1 and comprising means responsive to said reading means for increasing the distance between adjacent trays where different menu components are to be served for providing a visual warning of a change of menu components.

4. Food serving equipment as defined in claim 1, wherein said signal producing means comprise means for providing said first and second signals simultaneously and said visual indication means comprising means for displaying visual indications corresponding to said first and second signals simultaneously.

5. Food serving equipment comprising a conveyor belt, a plurality of trays, a tray dispenser adjacent said conveyor belt for dispensing said plurality of trays one at a time on to said conveyor belt, food receptacle dispensing means adjacent said conveyor belt for dispensing food receptacles onto said trays on said conveyor belt, a plurality of storage elements for storing information regarding menu components to be supplied to said food receptacles on said trays, reading means for reading said information stored by said storage elements, storage element dispensing means for dispensing said storage elements after reading on to an associated tray, a plurality of food serving trolleys past which said conveyor belts run and from which food can be served into said food receptacles on said trays, a plurality of containers for menu components to be served and positioned in each of said food serving trolleys, sensing means adjacent said conveyor belt and in advance of each said trolley for sensing approach of said trays to said trolley, a control device to which said information read by said reading means is fed, means for connecting said control device to each said trolley and to stores each associated with one said trolley, means for connecting each said store to its associated trolleys, means for connecting said sensing means to said control device to cause, on actuation of said sensing means, information relating to a tray sensed to be fed directly to said associated trolley and information stored in said associated store relating to an immediately preceding tray now adjacent said trolley to be fed to said trolley, and visual indication means on said trolley for indicating visually in different visual forms both the information relating to the adjacent said tray and that relating to the tray actuating said sensor.

6. Food serving equipment as defined in claim 5 and further comprising retaining means for selectively holding up trays prior to said food serving trolleys, a store device connected to said control device for storing information fed to said control device from said reading means, a comparator connected to said control device for comparing information received by said control device relating to a first tray and information from said store device relating to a second but preceding tray, a first timer actuable if said comparator compares the same information to release said retaining means after a first time period and a second timer actuable if said comparator compares different information to release said retaining means after a second time period longer than said first time period.

* * * * *